United States Statutory Invention Registration [19]

[11] Reg. Number: H765

Yu et al. [43] Published: Apr. 3, 1990

[54] SMOKE GENERATOR AND METHOD

[75] Inventors: Daniel Yu, University Park; Charles D. Corum, Abingdon, both of Md.

[73] Assignee: The United States of America as represented by the Secretary of the Army, Washington, D.C.

[21] Appl. No.: 361,460

[22] Filed: May 23, 1989

[51] Int. Cl.[4] ..... F02K 3/04

[52] U.S. Cl. ..... 60/264; 60/39.5

*Primary Examiner*—Deborah L. Kyle
*Assistant Examiner*—Michael J. Carone
*Attorney, Agent, or Firm*—Anthony T. Lane; Edward Goldberg; Edward F. Costigan

[57] ABSTRACT

The temperature of heated exhaust gases from a gas turbine is increased to a value sufficient to vaporize fog oil to form smoke. The turbine itself is unmodified and requires no bleed air control valve at the air inlet to the compressor to regulate exhaust gas temperature.

12 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

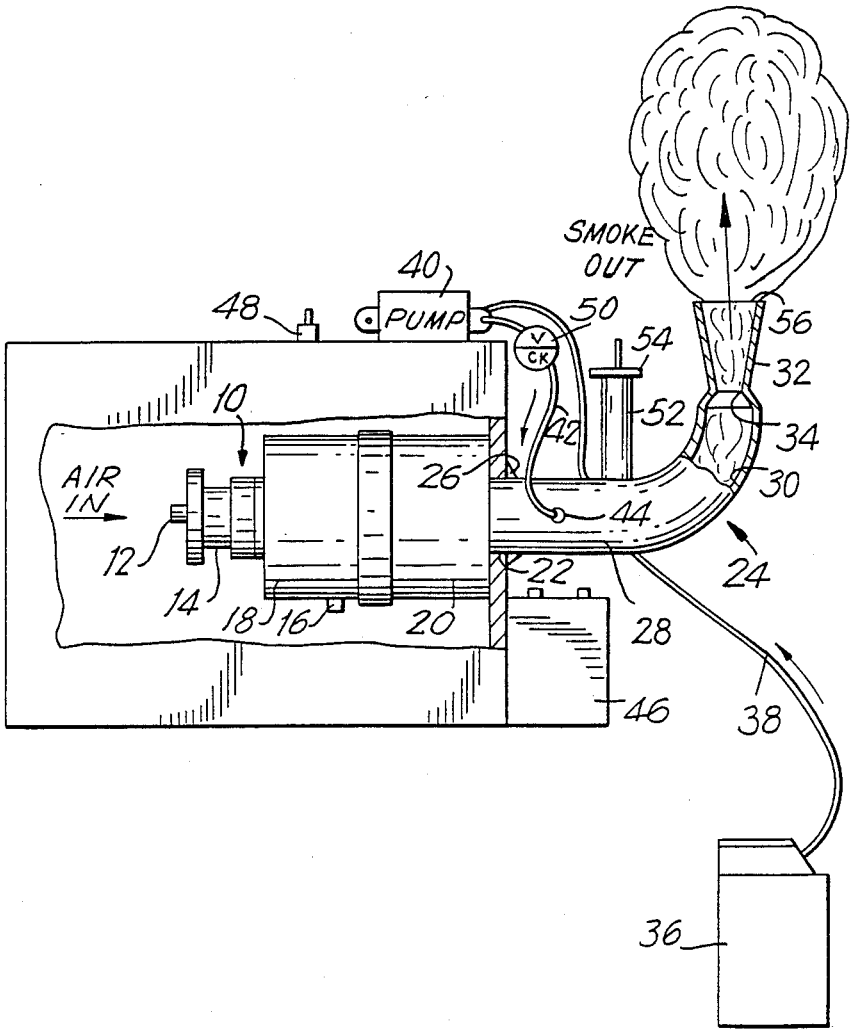
SMOKE OUT
40
PUMP
48
50
V
CK
54
56
32
10
52
34
42
AIR IN
26
30
44
12
24
22
14
18
16
20
28
46
38
36

SMOKE GENERATOR AND METHOD

STATEMENT OF GOVERNMENTAL INTEREST

The invention described herein may be manufactured, used, and licensed by or for the Government for governmental purposes without the payment of any royalties thereon.

BACKGROUND OF THE INVENTION

1. Field of the Invention

This invention generally relates to a smoke generator and a method of generating smoke and, more particularly, to a novel gas turbine exhaust arrangement operative for vaporizing fog oil to generate smoke.

2. Description of Related Art

There are many applications, particularly in the military, for generating smoke. Liquid materials, such as fog oil, are vaporizable at about 900° F. to produce smoke. However, heat generators capable of achieving such elevated vaporization temperatures are not readily available in the field. For example, small gas turbines having, inter alia, a compressor for drawing fresh air into a combustion chamber where fuel is burned, and a bladed rotor turnable by the combustion gases, discharge hot exhaust gases from the rotor at a temperature, under normal operating conditions, of about 500° F. which is substantially lower than that needed to vaporize fog oil.

In order to raise the temperature of the exhaust gases, it was known to bleed off some air from the compressor. A control valve was installed at the compressor, and was operative to direct some of the air drawn into the compressor into the ambient environment. By admitting less air into the combustion chamber, the temperature of the exhaust gases was raised to the aforementioned fog oil vaporization temperature.

Although there are many different types of gas turbines currently available in the inventory of the U.S. Armed Forces, many have no bleed air control valve to regulate the temperature of the exhaust gases. Complicated gas turbine modifications would be required to install such control valves and other associated control components. In some cases, such modifications cannot be done due to the design integrity of the turbine, because to implement such modifications would cause the overall performance of the turbine to be compromised.

SUMMARY OF THE INVENTION

1. Objects of the Invention

It is a general object of this invention to advance the state of the art of smoke generators.

It is another object of this invention to generate smoke by vaporizing fog oil with a gas turbine without requiring any turbine modifications.

A further object of this invention is to eliminate the need for modifying gas turbines with bleed air control valves at the compressor in order to raise the temperature of the exhaust gases to the point necessary to generate smoke.

Yet another object of this invention is to rapidly and efficiently generate smoke with currently available unmodified gas turbines.

2. Features of the Invention

In keeping with these objects, and others which will become apparent hereinafter, one feature of this invention resides, briefly stated, in a smoke generator which comprises combustion means for combusting air and fuel, and for discharging heated exhaust combustion gases. In a preferred embodiment, the combustion means is a gas turbine for combusting fresh air and liquid fuel in a combustion chamber.

The invention further comprises a supply of fog oil vaporizable at a smoking temperature, e.g. about 900° F., to generate smoke. An exhaust means is provided for conveying the heated exhaust gases along a path through a vaporization chamber away from the combustion means. The fog oil is conducted, preferably aided by a pump, to the vaporization chamber wherein the heated exhaust gases heat the fog oil.

In accordance with this invention, temperature control means are provided in the exhaust means. The temperature control means is operative for increasing the temperature of the heated exhaust gases to be at least equal to the smoking temperature to vaporize the fog oil in the vaporization chamber, thereby generating smoke.

The exhaust means is advantageously a tubular, hollow, exhaust pipe having an upstream portion at which the vaporization chamber is located, and a downstream portion at which the temperature control means is located. A flow restrictor at the downstream pipe portion restricts the flow of the heated exhaust gases emerging from the vaporization chamber, and limits the amount of the air entering the turbine. More particularly, the flow restrictor is a constriction in the exhaust pipe. This constriction has a flow-through cross-section which is smaller in size than the flow-through cross-section of the upstream pipe portion.

In accordance with this invention, there is no need to install bleed air control valves or any other associated control components at the compressor of the gas turbine, or to modify the gas turbine in any way. It is merely necessary to mount, according to the preferred embodiment, the exhaust pipe at the outlet of the gas turbine. The constriction in the exhaust pipe creates a back-pressure in the gas turbine which, in turn, limits the amount of air that enters the turbine, thereby effectively raising the temperature of the exhaust gases without modifying the turbine.

The temperature control means advantageously includes an adjustable slide gate valve on the upstream portion of the exhaust pipe. The slide gate valve is initially fully open when the gas turbine begins operation so that very little back-pressure, if any, is presented thereto during start-up. As the turbine reaches steady-state operation, the slide gate valve is closed to a greater extent until, finally, it is completely closed, at which point, the constriction alone is solely responsible for regulating the temperature of the exhaust gases.

The method of generating smoke according to this invention comprises the following steps: combusting air and fuel to discharge heated combustion gases to and through a vaporization chamber; conducting fog oil vaporizable at a smoking temperature to a vaporization chamber for heating by the heated exhaust gases therein; and increasing the temperature of the heated exhaust gases at the vaporization chamber to be at least equal to the smoking temperature to vaporize the fog oil in the vaporization chamber, thereby generating smoke.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWING

The single figure is a broken-away, partly-sectioned side view of a smoke generator according to this invention.

DETAILED DESCRIPTION OF THE PREFERRED EMBODIMENTS

The single figure illustrates a conventional gas turbine 10 having an air inlet 12, a compressor 14 operative for drawing fresh air into the turbine, a fuel inlet 16 for admitting liquid fuel, a combustion chamber 18 for burning the liquid fuel in the presence of the compressed air, and a bladed rotor 20 turnable by the heated exhaust gases emerging from the combustion chamber 18. The heated exhaust gases are discharged from the turbine via discharge outlet 22. Prior to such discharge, the heated exhaust gases may be conducted to a non-illustrated heat exchanger which is in a heat exchanging relationship with the compressed air emerging from the compressor in order to pre-heat the air entering the combustion chamber. The rotor and the compressor share a common shaft which, in turn, is operatively connected to a conventional non-illustrated starter motor and generator set.

The gas turbine 10 is entirely conventional and requires no extended discussion, except to point out that, under normal operating conditions, a gas turbine such as the U.S. Air Force Model No. EMU-12 typically discharges the heated exhaust gases at a temperature of about 500° F.

However, this exhaust gas temperature is not high enough to vaporize fog oil, which is typically vaporizable at about 900° F., to form smoke. This invention relates to increasing the temperature of the exhaust gases to be at least equal to, if not exceeding, the smoking temperature.

Exhaust means, preferably constituted by a tubular, hollow, exhaust pipe 24, is connected to the discharge outlet 22. The pipe 24 includes a flange 26 for mounting to the outlet 22, an upstream portion 28 in the interior of which a vaporization chamber 30 is located, and a downstream portion 32 in the interior of which a temperature control means 34 as described below is located. A supply 36 of fog oil is conducted by tubing 38 to a pump 40 operative for pressurizing the fog oil and for directing the same through tubing 42 to a fog oil inlet 44 which is in communication with the vaporization chamber 30. A battery 46 used to start the turbine 10 may also be used to power the pump through the intermediary of an ON/OFF switch 48. A one-way check valve 50 is located in the tubing 42 in order to prevent return-flow of the fog oil to the pump 40. An upright, hollow, support 52 is mounted on the upstream pipe portion 28 and is superimposed by a slide gate valve 54. The valve 54 is manually movable between a fully-open position in which the vaporization chamber 30 is in free communication with the ambient environment, and a fully-closed position in which the only avenue of escape for the fog oil and the heated exhaust gases within the combustion chamber 30 to exit the exhaust pipe 24 is through the outer open end 56 of the downstream pipe portion 32.

The temperature control means 34 is a flow-restrictor operative for restricting the flow of the heated exhaust gases emerging from the vaporization chamber 30. The restrictor defines a flow-through cross-section whose size is smaller than that of the upstream pipe portion 28. The restrictor is advantageously formed as a constriction in the exhaust pipe. The exhaust pipe has upstream tapered walls converging toward the constriction 34, and downstream tapered walls diverging away from the constriction 34, thereby imparting an hourglass shape for the downstream pipe portion 32.

The constriction 34 impedes the flow of heated exhaust gases and vaporized fog oil along the exhaust pipe toward the outlet 56, and builds up a back-pressure all the way back into the turbine 10. Eventually, the air that enters via the inlet 12 is limited. By reducing the amount of air entering the turbine 10, the combustion chamber 18 operates at a higher temperature, and the discharge exhaust gases have an increased temperature. By appropriately dimensioning the size of the constriction 34, it is possible to raise the temperature of the exhaust gases to be at least equal to, if not greater than, the smoking temperature of the fog oil so that the latter is virtually immediately vaporized within the vaporization chamber 30, thereby causing the resulting smoke to issue from the outlet 56.

During start-up of the turbine, it is not desirable to limit the amount of air that enters the compressor 14. Hence, in order to counteract the effects of the constriction 34 during initial turbine start-up, the slide gate valve is manually opened to the fully-open position, thereby presenting the heated exhaust gases with another outlet to escape the exhaust pipe 24. As the turbine 10 reaches steady-state operation, the slide gate valve 54 is progressively closed so that the only avenue of escape for the smoke is via the outlet 56.

The aforementioned Air Force gas turbine Model No. EMU-12 has an annular discharge outlet 22 of about 5 inches in diameter, which is the same diameter as the upstream pipe portion 28. At the constriction 34, the internal diameter of the downstream pipe portion 32 is about 2.5 inches. The inside diameter of the constriction 34 is individually designed for different types of gas turbines.

During normal operation, the heated exhaust gases discharged into the vaporization chamber 30 vaporizes the fog oil thereat to form smoke. The smoke generation rate is approximately 2 gallons per minute.

It will be understood that each of the elements described above, or two or more together, also may find a useful application in other types of constructions differing from the types described above.

While the invention has been illustrated and described as embodied in a smoke generator and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A smoke generator, comprising:

(a) combustion means for combusting air and fuel, and for discharging heated exhaust combustion gases;

(b) a supply of fog oil vaporizable at a smoking temperature to generate smoke;

(c) exhaust means for conveying the heated exhaust gases along a path through a vaporization chamber away from the combustion means;

(d) means for conducting the fog oil to the vaporization chamber for heating by the heated exhaust gases therein; and (e) temperature control means in the exhaust means for increasing the temperature of the heated exhaust gases to be at least equal to the smoking temperature to vaporize the fog oil in the vaporization chamber, thereby generating smoke.

2. The smoke generator as recited in claim 1, wherein the combustion means is a gas turbine having a combustion chamber, compressor means for drawing the air into the combustion chamber, fuel inlet means for admitting the fuel into the combustion chamber into the presence of the air, a bladed rotor turnable by the heated exhaust gases emerging from the combustion chamber, and a discharge outlet for discharging the heated exhaust gases leaving the rotor.

3. The smoke generator as recited in claim 2, wherein the exhaust means is a tubular, hollow, exhaust pipe connected to the discharge outlet, said exhaust pipe having an upstream portion at which the vaporization chamber is located, and a downstream portion at which the temperature control means is located.

4. The smoke generator as recited in claim 3, wherein the conducting means includes an inlet on the upstream portion of the exhaust pipe and pumping means for pumping the fog oil under pressure from the supply to the inlet into the vaporization chamber.

5. The smoke generator as recited in claim 3, wherein the temperature control means includes a flow restrictor for restricting the flow of the heated exhaust gases emerging from the vaporization chamber, and for limiting the amount of the air drawn into the turbine by the compressor means.

6. The smoke generator as recited in claim 5, wherein the upstream portion of the exhaust pipe has a flow-through cross-section of a predetermined size, and wherein the flow restrictor has a flow-through cross-section of a size smaller than said predetermined size.

7. The smoke generator as recited in claim 6, wherein the flow restrictor is a constriction in the exhaust pipe.

8. The smoke generator as recited in claim 6, wherein the temperature control means includes an adjustable valve on the upstream portion of the exhaust pipe, and operative for controlling the predetermined size of the flow-through cross-section during operation of the smoke generator.

9. The smoke generator as recited in claim 8, wherein the valve is a slide gate valve.

10. A smoke generator, comprising:

(a) a gas turbine for combusting fresh air and liquid fuel in a combustion chamber, and for discharging heated combustion exhaust gases;

(b) a supply of fog oil vaporizable at a smoking temperature to generate smoke;

(c) exhaust means for conveying the heated exhaust gases along a path through a tubular, hollow, exhaust pipe away from the combustion chamber, said exhaust pipe having an upstream vaporization chamber and a downstream outlet;

(d) means for conducting the fog oil to the vaporization chamber for heating by the heated exhaust gases therein; and (e) temperature control means at the downstream outlet for increasing the temperature of the heated exhaust gases to be at least equal to the smoking temperature to vaporize the fog oil in the vaporization chamber, thereby generating smoke for discharge through the downstream outlet.

11. The smoke generator as recited in claim 10, wherein the temperature control means is a constriction in the exhaust pipe adjacent the downstream outlet.

12. A method of generating smoke, comprising the steps of:

(a) combusting air and fuel to discharge heated exhaust combustion gases;

(b) conveying the heated exhaust gases along a path through a vaporization chamber;

(c) conducting fog oil vaporizable at a smoking temperature to the vaporization chamber for heating by the heated exhaust gases therein; and (d) increasing the temperature of the heated exhaust gases at the vaporization chamber to be at least equal to the smoking temperature to vaporize the fog oil in the vaporization chamber, thereby generating smoke.

* * * * *